Jan. 21, 1969 R. BECKER 3,422,779
TANKSHIP FOR THE TRANSPORTATION OF LOW-TEMPERATURE
LIQUEFIED GASES
Filed April 3, 1967
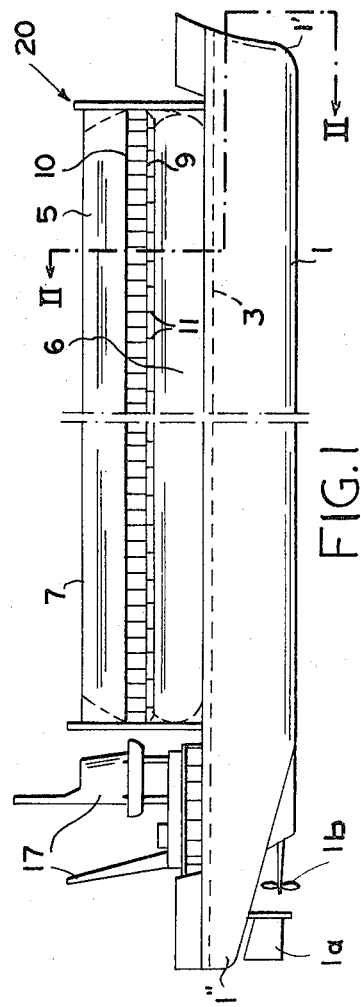
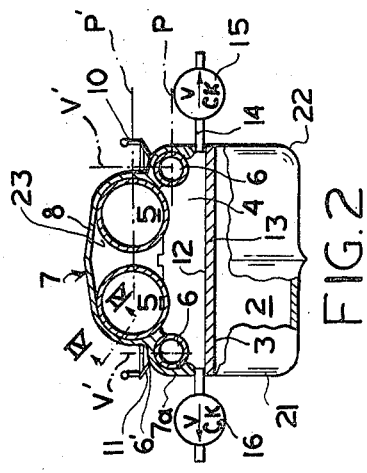
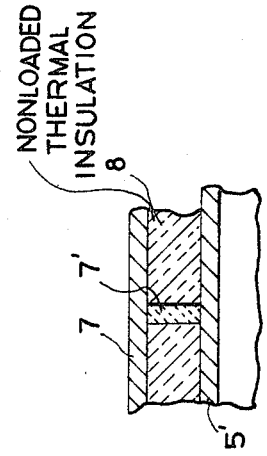
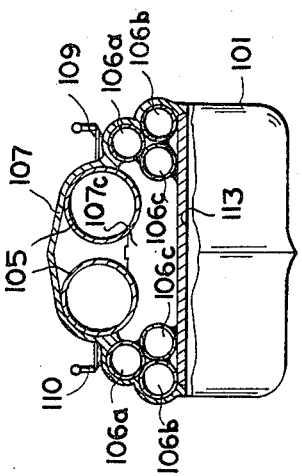
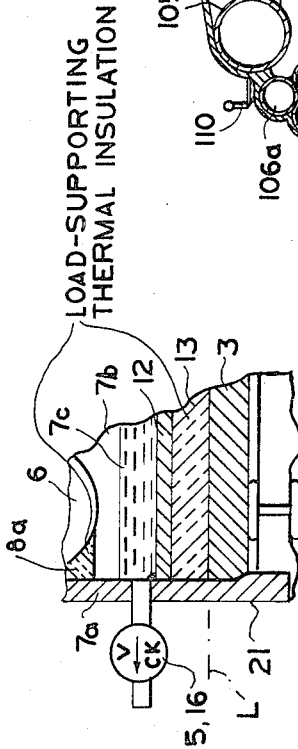
RUDOLF BECKER
INVENTOR.
BY Karl G. Ross
Attorney United States Patent Office 3,422,779
Patented Jan. 21, 1969

3,422,779
TANKSHIP FOR THE TRANSPORTATION OF
LOW-TEMPERATURE LIQUEFIED GASES
Rudolf Becker, 9 Zwengauerweg, 8 Munich 71, Germany
Continuation-in-part of application Ser. No. 623,720,
Mar. 16, 1967. This application Apr. 3, 1967, Ser.
No. 653,283
Claims priority, application Germany, Mar. 28, 1966,
L 53,208
U.S. Cl. 114—74                                12 Claims
Int. Cl. B63b 25/16; B65d 81/18

ABSTRACT OF THE DISCLOSURE

Tank ship for the transportation of low-temperature liquefied gases, especially methane, wherein a main-tank assembly is mounted upon a normally empty hull of the ship whose deck lies substantially at the waterline when the tanks are filled and the main tanks are flanked by at least one pair of auxiliary tanks of smaller diameters lying along the longitudinal sides of the vessel to shield the main tanks from the shock. A walkway is provided above these outer auxiliary tanks, while an apron connects the tanks with the deck structure and the side walls of the hull to form a sealed enclosure which may be maintained at a pressure above atmospheric, the tanks being maintained at or slightly above this upper atmospheric pressure. Lateral outlets discharge collected leakage liquids via pressure-relief and/or check valves.

---

This application is a continuation-in-part of my copending application Ser. No. 623,720, filed Mar. 16, 1967, and entitled "Tankship for the Transportation of Low-Temperature Liquefied Gases" (now abandoned).

My present invention relates to seagoing vessels for the transportation of liquefied gases at low temperatures, especially methane and, more particularly, to tankships having a tank structure for the liquefied gases above a substantially vacant hull.

While liquid cargoes are generally transported in one or more tanks located within the hull or keel of a ship, i.e. below the deck thereof, considerable problems have arisen in the transportation of low-temperature liquefied gases such as methane, in which gas leakage, internal pressures and the like are involved, in structures of this type.

The transportation of such liquefied gases involves various difficulties arising from the fact that the gases may be contained under elevated pressures and must be thermally insulated from introduction of heat. Furthermore the tanks are relatively large and must be mounted in the ship sufficiently to resist the stresses developed by the mass of the contents and the constant pitch and yaw motion of the ship. Conventional techniques for mounting these tanks have proved to be insufficient to resist such seagoing stresses and the battering of high seas against the liquefied-gas tanks.

It is the principal object of the present invention to provide an improved tankship structure for the transportation of low-temperature liquefied gases whereby the aforementioned disadvantages are obviated.

Still another object of the present invention is to provide an improved assembly for anchoring elongated horizontal liquefied-gas tanks to the deck of a vessel.

I have now found that the securing of a generally horizontal, longitudinally extending main tank for the retention of low-temperature liquefied gases upon the deck of a tankship or other vessel for the transportation of the liquefied gases can be improved markedly with respect to resistance to the stresses arising from battering by high seas and the violent repeated and random movements of the support, i.e. the deck and hull of the ship on the sea, by interposing between the deck and the main tanks (of relatively large diameter), at least one further or auxiliary tank of relatively small diameter which is anchored to the deck and to the main tank along at least one side of the vessel. Thus, I have found that a pair of auxiliary tanks of relatively small diameter (i.e. of a diameter equal to a minor fraction of the diameter of the main tank) can extend along the starboard and port sides of the ship outwardly of the large-diameter main tanks but parallel to the latter substantially over their entire length and thereby provide barriers resisting lateral movement or stress upon these main tanks and facilitating their connection with the deck without, however, materially increasing the heat transfer. When the term "outwardly" is used herein to indicate the position of the auxiliary tanks with respect to the main tanks, it is intended to define a relationship such that the diameter of each auxiliary tank is located outwardly of the outermost surface of the main tank while the innermost surface of each of these auxiliary tanks is located outwardly of the vertical plane of the diameter of the proximal main tank.

Furthermore, while the present invention provides for at least two auxiliary tanks of the character described, to be disposed alongside and flanking the main tanks outwardly thereof but inwardly of the longitudinal outlines of the hull (i.e. within the space defined by the deck) a number of auxiliary tanks may be provided alongside the main tank in superimposed relationship. Preferably, the auxiliary tanks are disposed below the common horizontal axial plane of the main tanks. The auxiliary tanks should, however, lie sufficiently above the deck so as to form barriers to attack by violent seas upon the main tanks during operation of the vessel.

The auxiliary tanks lying along the starboard and port sides of the ship and flanking the main tanks, individually or collectively extend above the deck alongside the main tanks to a height sufficient to block impact of the sea against the main tanks during voyage of the vessel. Moreover, I have found it to be an important feature of this invention to provide an apron or housing fully enclosing the tank assembly and connecting the tank assembly with the deck along the sides of the vessel. Thus a substantially uninterrupted apron can continue the side walls of the ship's hull upwardly around the outermost portions of the auxiliary tanks and the outer walls of the main tanks, while forming with the deck a substantially hermetically sealed enclosure whose purpose is described in greater detail hereinafter. Between the apron and the low-temperature main tanks, I provide a thermal insulation layer which, if load-supporting (e.g. highly porous sintered ceramic) material serves to mechanically connect the apron to the tank walls, and if not load-supporting (e.g. of polystyrene foam or loose-piled insulation) is used in conjunction with thermally insulating spacer bodies for supporting the apron upon the main tank.

As indicated earlier, the vertical axial plane through the auxiliary tanks is advantageously disposed outwardly of the outermost flank of the main-tank assembly whereby a ridge is formed along the starboard and port sides of the main-tank assembly above the deck, this ridge being provided with a catwalk or railed walkway permitting crewmen to move along the sides of the vessel well above the deck water line.

The apron forms a hermetically sealed housing with a heat barrier lying below the main-tank assembly and advantageously spaced therefrom so as to form the deck of the vessel. This partition, which can be carried by a load-supporting insulation layer, forms a pan for the collection of liquid leaking into the apron or leaking from the tank assemblies. Advantageously, the walls of the apron are sealingly connected with the floor of the hermetically sealed room and the floor is disposed somewhat below even the auxiliary tanks to form the collecting pan. The latter is provided with means for discharging the collected liquid into the sea. I have found it to be desirable to so form the housing that it will retain a gas pressure and to provide the last-mentioned means as pressure-release or "blow-off" valves adapted to open suddenly and discharge the liquid behind it when the pressure in the housing attains a predetermined maximum. The outlet of the blow-off valve or valves is located substantially at the level of the sea, i.e., at the water line of the vessel when at least its main-tank assembly is fully laden and preferably when its auxiliary tanks are also filled. In place of or in addition to the blower valves, I provide one or more check valves communicating between the collecting pan and the surrounding environment for discharging gases developing within the housing or liquids collected therein, while preventing flow of seawater into the housing in the opposite direction.

All the auxiliary tanks described earlier can be used for the transportation of fluids other than those carried in the main-tank assembly, it is to be noted that the same fluid may also be contained therein. I have found that the smaller-diameter auxiliary tanks can be constructed with a relatively high pressure rating so as to retain normally liquefied gases such as methane, in the liquid condition under relatively high pressures and at relatively high temperatures. In this case, an insulation layer is not required between the apron and the auxiliary tank. Alternatively, the auxiliary tank contains a liquefied gas at low pressure but at relatively low temperatures, and a layer of thermal insulation is disposed between the apron and these tanks.

The above and other objects, features, and advantages of the present invention will become more readily apparent from the following description, reference being made to the acompanying drawing, in which:

FIG. 1 is a side-elevational view of a seagoing vessel for the transportation of liquefied methane and other low-temperature gases;

FIG. 2 is a cross-sectional view taken generally along the line II—II of FIG. 1;

FIG. 3 is a cross-sectional view similar to FIG. 2 but illustrating a modification of this invention;

FIG. 4 is a detail view of the apron structure when generally along the line IV—IV of FIG. 2; and FIG. 5 is a detailed cross-sectional view of the leakage-collecting pan or tray of the ships of FIGS. 1–3.

The tank ship of the present invention comprises, in the conventional manner, a hull or keel 1 forming a hold 2 which is empty during the transportation of liquefied gases but which may be used during a return trip to carry cargo of any convenient type. The keel 1 has a bow portion 1' and a stern 1" at which the rudder 1a and the screw 1b are provided in the usual manner. The superstructure, i.e., the navigation and control cabins 17 etc. are located at the stern rearwardly of a tank structure 20 mounted upon the upper deck 3 represented in broken lines in FIG. 1, all though the superstructure may also be disposed forwardly of the main-tank assembly 4, 5.

The tank assembly 20 comprises a plurality of longitudinally spaced support pedestals 4 upon which the large-diameter main tanks 5 are mounted with substantially horizontal axes parallel to the deck and parallel to the starboard and port longitudinal sides 21, 22 of the vessel but inwardly thereof. These main tanks, shown to be two in number, have their horizontal axes in a common plane parallel to the deck structure 3 and are disposed symmetrically on opposite sides of a median longitudinal vertical plane M.

Flanking the main-tank assembly 5, the pedestals 4 carry a pair of auxiliary tanks 6 of relatively small diameter, these auxiliary tanks being disposed along the outer flanks of the tanks 5 and along the outer longitudinal sides 21 and 22 of the vessel 1. The tanks 6, whose diameters are only a fraction of the diameters of the main tanks 5, have horizontal axes lying in a plane P below the plane P' of the axes of the tanks 5. In addition, each tank 6 has a vertical axial plane V' disposed outwardly of the outermost wall of the corresponding tank 5 but inwardly of the respective side 21, 22 of the ship. The pedestals 4 support the tanks 5 and 6 while layers of thermal insulation are disposed between the pedestals and these tanks and between the pedestals and the deck 3. In the regions in which the tanks 5 and 6 approach one another, layers of thermal insulation are disposed between them. The tanks 5 and 6 are, moreover, provided with partitions at spaced locations along their lengths to prevent or limit shifting of the liquid cargo.

The tanks 5 and 6 are enclosed within an apron 7 which extends the side walls 21 and 22 of the ship above the deck 3 and encloses the tanks in an hermetically sealed chamber 23 in which a blanket of a protective gas, e.g. nitrogen or carbon dioxide, excludes oxygen and prevents explosion of the vapors of methane which may enter this chamber from the tanks 5. As can be seen from FIG. 4, the apron 7 is spaced from but connected to the walls 5' of the tanks 5 by thermally insulating spacers 7' and the intervening gap is filled with a nonload-bearing thermal insulation 8 (e.g. a loose packing of mineral fibers, blankets of glasswool or foamed (cellular) polystyrene). The flanks 7a of the apron are united with the side walls 21 and 22 of the ship as illustrated in FIG. 5 so as to form a pan 7b in which leakage liquids 7c can be collected above a partition 12 of the deck structure 3. When the tanks 6 are cold, layers 8a of thermal insulation are interposed between them and the apron 7. In the system of FIG. 5, the layers 8a are shown to be of the load-supporting type, i.e. sintered or fritted glass or ceramic; with the load-supporting thermal insulation 8a, which can be used also between the apron 7 and the tank walls 5', no spacers 7' are required. Thus, the side walls 21 and 22 of the ship's hull are extended around and connected with the outer walls of the auxiliary tanks 6 and the main tanks 5 by the apron 7, the load-supporting thermal insulation 8a and/or the spacers 7'. The tanks 6 form ridges or platforms 6' along which transverse girders 11 are disposed in longitudinally spaced relationship, these girders being welded to the apron 7 to form ribs thereon. Upon these ribs, there is mounted, on each side of the main-tank assembly, a walkway or platform 9 flanked by a railing 10 affording access of the crew to the bow 1' of the ship and the tank assembly 20.

The deck 3 of the ship carries a layer 13 of load-supporting thermal insulation overlain by the floor 12 of the liquid-collecting pan 7b. This floor 12 is welded to the wall 7a of the apron 7 and provides therewith a liquid- and gastight enclosure for the tanks. The chamber 23 formed by this enclosure communicates with the atmosphere via a pair of lateral outlet pipes 14 disposed at low points of the pan or tray 7b and provided with pressure-relief blow-off valves 15 and check-valve flaps 16 which resist reverse flow of water from the surrounding sea into the chamber 23. Liquid 7c collecting in the chamber 23 thus is spontaneously discharged upon development of a pressure within the chamber 23 above a predetermined level. The water line of the ship is disposed substantially at the level L of the deck 3 or somewhat thereabove in a fully laden state of the tanks 5 and 6.

According to an important feature of this invention, the protective gas is maintained within the chamber 23 at an elevated pressure of several meters (water column) above ambient atmospheric pressure. In the tanks 5 and 6, a corresponding or slightly higher pressure is sustained to prevent implosion of the tanks.

In FIG. 3, I show a modified assembly wherein the empty ship's hull 101 is substantially identical to that of FIGS. 1 and 2 except that the tanks 105 are flanked by a plurality of stacked auxiliary tanks 106a, 106b, 106c. Again, these auxiliary tanks form a base for the walkway 109 and railings 110 while apron 107 encloses the tanks and is connected with the side walls of the ship 101. In this embodiment, the tanks 106b and 106c are sealingly joined to the floor 113 so as to form a liquid-tight tray 107c.

Thus, in the embodiment of FIGS. 1 and 2, the leakage liquids collected within the tray 7c can be discharged freely over the side of the ship or ejected under the pressure of the projected gas, while in the arrangement of FIG. 3, the tray 107c retains the liquid until the ship reaches its next port, whereupon the liquid can be recovered if desired.

I claim:

1. A seagoing vessel for the transportation of liquefied gases at low temperature, comprising:
   an elongated hull having side walls;
   a deck structure on said hull;
   a main-tank assembly surmounting said deck and above the waterline of the vessel for containing said liquefied gases at low temperature, said main-tank assembly including at least one relatively large-diameter tank extending along said deck structure between the side walls of said hull; and
   a pair of auxiliary tanks of relatively small diameter flanking said main-tank assembly and extending along the sides of said deck longitudinally thereof for protecting said main-tank assembly against ocean stresses.

2. The vessel defined in claim 1 wherein said main-tank assembly is flanked on each side thereof by a plurality of stacked auxiliary tanks of relatively small diameter, said auxiliary tanks being anchored to said deck assembly.

3. The vessel defined in claim 2, further comprising an apron extending around said auxiliary tanks and said main-tank assembly while continuing the side walls of said hull and being joined thereto.

4. The vessel defined in claim 3, further comprising a layer of thermal insulation disposed between said main tank and said apron, said apron being connected to said main tank.

5. A seagoing vessel for the transportation of liquefied gases at low temperature, comprising:
   an elongated hull having side walls;
   a deck structure on said hull;
   a main-tank assembly surmounting said deck and above the waterline of the vessel for containing said liquefied gases at low temperature, said main-tank assembly including at least one relatively large-diameter tank extending along said deck structure between the side walls of said hull;
   a stack of auxiliary tanks of relatively small diameter flanking said main-tank assembly on each side thereof and extending along the sides of said deck longitudinally thereof for protecting said main-tank assembly against ocean stresses, said auxiliary tanks being anchored to said deck assembly;
   an apron extending around said auxiliary tanks and said main-tank assembly while continuing the side walls of said hull and being joined thereto, said auxiliary tanks forming ridges extending longitudinally along the flanks of said main tank assembly; and
   a walkway mounted on at least one of said ridges.

6. A seagoing vessel for the transportation of liquefied gases at low temperature, comprising:
   an elongated hull having side walls;
   a deck structure on said hull;
   a main-tank assembly surmounting said deck and above the waterline of the vessel for containing said liqueffed gases at low temperature, said main-tank assembly including at least one relatively large-diameter tank extending along said deck structure between the side walls of said hull;
   a stack of auxiliary tanks of relatively small diameter flanking said main-tank assembly on each side thereof and extending along the sides of said deck longitudinally thereof for protecting said main-tank assembly against ocean stresses, said auxiliary tanks being anchored to said deck assembly;
   an apron extending around said auxiliary tanks and said main-tank assembly while continuing the side walls of said hull and being joined thereto; and
   a floor beneath said main-tank assembly sealingly connected to said apron and forming part of said deck structure, said floor forming with said apron a tray for collecting liquids leaked into the space enclosed by said apron, said deck structure further comprising a load-supporting layer of thermal insulation underlying said floor.

7. A seagoing vessel for the transportation of liquefied gases at low temperatures, comprising an elongated hull, a deck structure extending along said hull, a main-tank assembly surmounting said deck and disposed above the waterline of the vessel for retaining the low-temperature liquefied gas, said main-tank assembly including at least one main tank of relatively large diameter, and a pair of auxiliary tanks of relatively small diameter flanking said main-tank assembly and extending along the sides of said deck structure longitudinally thereof and mounted upon said deck structure.

8. The vessel defined in claim 6 wherein said space is maintained under a superatmospheric pressure and is filled with a protective gas blanket, said tray being provided with at least one lateral outlet and a pressure-relief valve at said outlet for discharging fluid from said space upon the development of pressures exceeding a predetermined maximum pressure therein.

9. The vessel defined in claim 6 wherein said tray is provided with a lateral outlet along said floor and a check-valve at said outlet permitting escape of fluid from said space into the sea, but preventing reverse flow of sea water into said space.

10. The vessel defined in claim 1, further comprising housing means enclosing said tanks in a space maintained under superatmospheric pressure, at least some of said tanks being maintained at a pressure at least equal to the pressure in said space to prevent implosion of the tanks.

11. The vessel defined in claim 6 wherein said tray is provided with an outlet at a low point thereof opening into the exterior at a location above the waterline of the vessel to permit free escape of leakage liquids collected in said tray into the sea.

12. The vessel defined in claim 1 wherein said deck structure includes a floor connected sealingly with said auxiliary tanks so as to form therewith an enclosure for collecting leakage liquids.

References Cited

UNITED STATES PATENTS

| 1,140,250 | 5/1915 | Cabot. |
| 3,159,005 | 12/1964 | Reed et al. _____ 114—74 |

FOREIGN PATENTS 784,390  10/1957  Great Britain.

TRYGVE M. BLIX, *Primary Examiner.*

U.S. Cl. X.R.

220—15